United States Patent Office 3,346,626
Patented Oct. 10, 1967

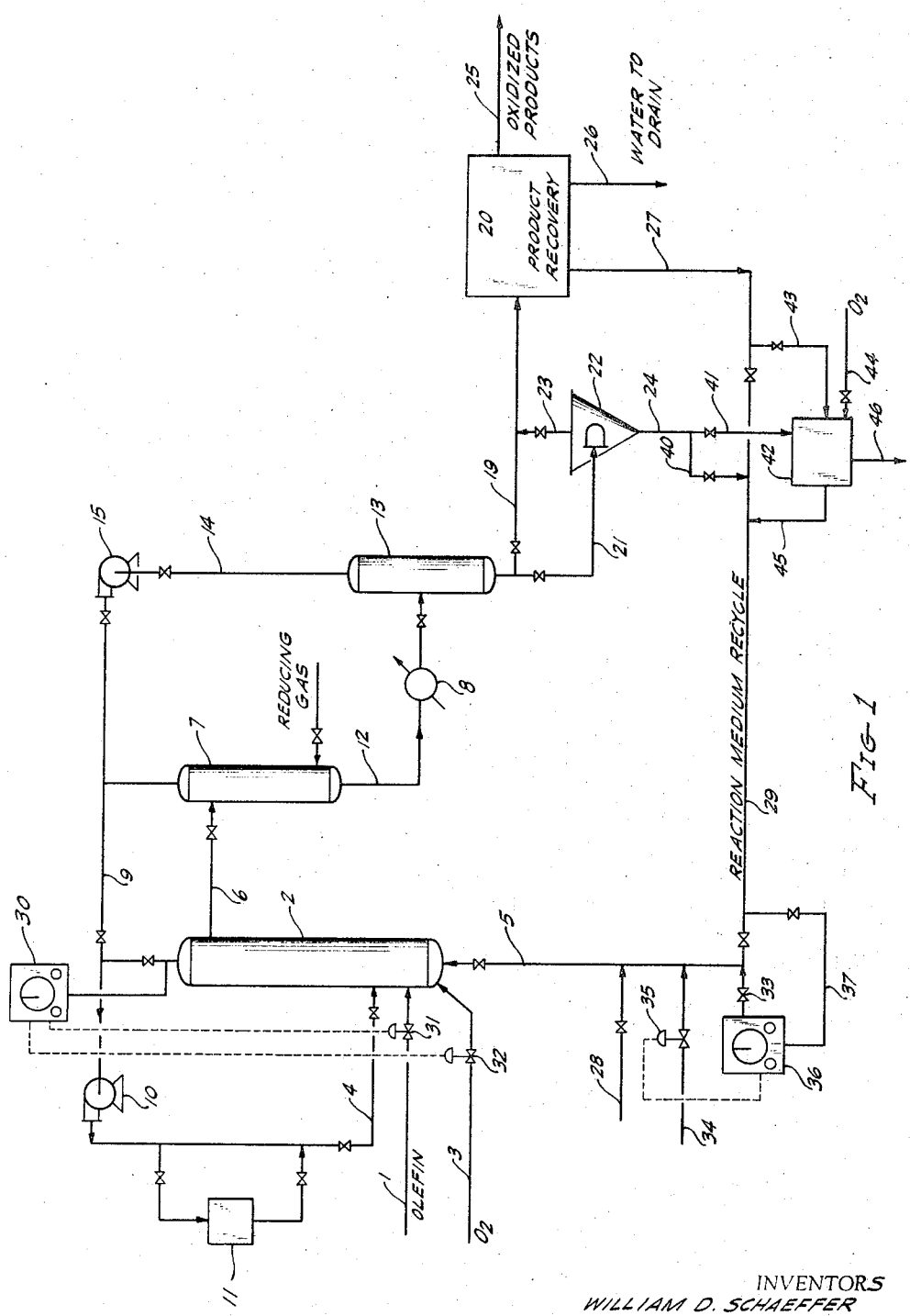

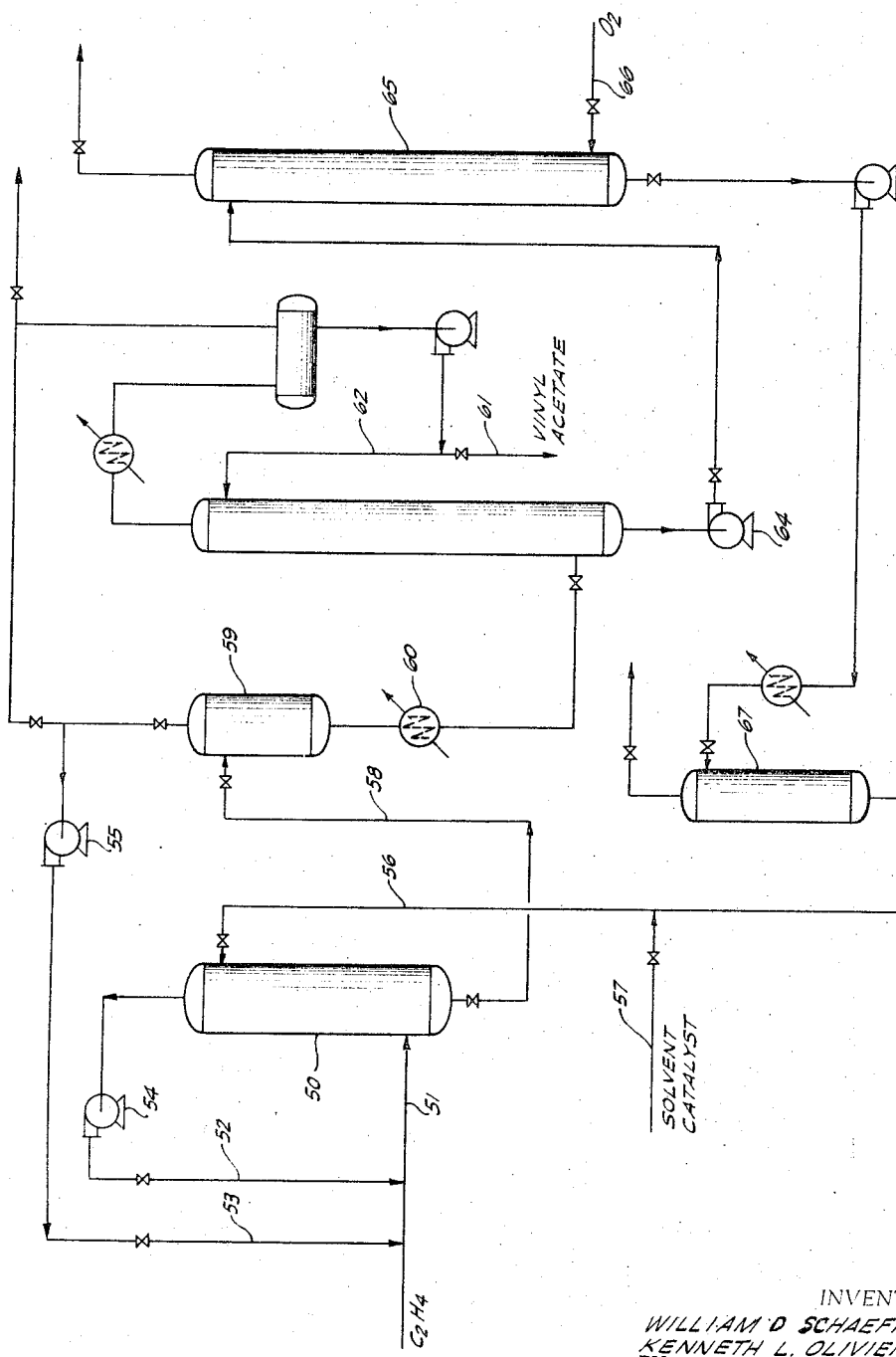

3,346,626
OXIDATION OF ETHYLENE TO VINYL ESTERS BY A PLATINUM GROUP METAL CATALYST IN THE PRESENCE OF A HALOGEN COMPOUND, A HEAVY METAL SALT, MOLECULAR OXYGEN AND A VANADIUM COMPOUND
William D. Schaeffer, Pomona, and Kenneth L. Olivier, Placentia, Calif., assignors to Union Oil Company of California, Los Angeles, Calif., a corporation of California
Filed Mar. 16, 1966, Ser. No. 534,763
7 Claims. (Cl. 260—497)

This application is a continuation-in-part of our copending application, Ser. No. 329,082 filed Dec. 9, 1963, now abandoned.

This invention relates to the oxidation of olefins to carbonyl compounds by the use of organic solutions containing catalytic amounts of a platinum group metal and a heavy metal redox salt and, in particular, relates to a method for preventing insoluble organic precipitates of the heavy metal redox salt during the process.

In a particular embodiment, this invention relates to the oxidation of ethylene to vinyl acetate and acetaldehyde in the presence of an acetic acid solution containing a platinum group metal, particularly solutions containing palladium.

The aforementioned oxidation of olefinic compounds involves the simultaneous reduction of the dissolved platinum group metal ions to the free metal and the reoxidation of the metal to dissolved ions. Additionally, the heavy metal redox salts such as copper and iron fluctuate between their high and low oxidation state during the reaction. Consequently, the solution withdrawn as a crude product from the reactor contains the platinum group metal as suspended particles of the free metal and as dissolved ion together with both the high and low oxidation states of the heavy metal redox salt.

The reoxidation or regeneration of the catalyst can be performed in a reaction zone separate from the vinyl acetate synthesis zone or both reactions can be performed in a common zone. In either case, ethylene and oxygen are contacted with the substantially anhydrous reaction medium. In the two-stage method which is disclosed in copending application, Ser. No. 161,932, now Patent 3,260,739, the acetic acid reaction medium which contains the catalyst salts is circulated between the vinyl acetate synthesis zone where it is contacted with ethylene and the reoxidation zone where it is contacted with oxygen. The contacting with ethylene results in reduction of the solution, frequently with precipitation of the reduced forms of the catalyst, e.g., palladium metal and cuprous chloride, although the extent of this precipitation can be diminished by also introducing a minor amount, up to about 5 volume percent, of oxygen into the synthesis reactor. The reduced catalyst, dissolved or suspended in the reaction medium, is then passed to the reoxidation zone, preferably after having been distilled to recover the vinyl acetate product and byproducts. In the reoxidation zone, the catalyst is restored to its higher valency state e.g., palladous and cupric salts, by contact with oxygen. The regenerated solution can then be returned to the vinyl acetate synthesis zone, preferably after vaporization of the water formed during reoxidation.

The single stage reaction can be practiced by contacting ethylene and oxygen simultaneously with the reaction medium in a single reaction zone. The catalyst need not be circulated between separate zones and the products can be withdrawn as a liquid or vapor effluent. The single stage reaction is further described in our copending applications, Ser. Nos. 299,936 and 301,239.

In copending application Ser. No. 299,936, it is disclosed that the crude oxidate withdrawn from the reactor is preferably treated with a reducing gas prior to its handling and distillation so as to prevent the subsequent precipitation of the platinum group metal on the surfaces of the distillation equipment. In said application, this reducing treatment is disclosed to comprise passing the crude product through a reducing guard chamber or vessel and contacting it therein with a reducing gas such as carbon monoxide or hydrocarbon olefins having from about 2 to about 5 carbon atoms, e.g., ethylene, propylene, butene, pentene, isobutene, etc. Also disclosed in said copending application is the method of controlling the reaction to starve the reaction for oxygen. By this procedure, a reducing environment can be achieved in the oxidation reactor itself and the reducing guard chamber can be eliminated or employed only to insure against upsets in the reaction itself. As disclosed in said application, this method can be practiced by continuously analyzing the reactor vapor space or the reactor vapor effluent for oxygen content and controlling the ratio of inlet oxygen to ethylene to maintain said oxygen content less than 1 volume percent and most preferably less than about 0.5 volume percent.

In copending application Ser. No. 301,239, it is disclosed that the heavy metal redox salts, in particular copper salts, when reduced to cuprous salts have a limited solubility in the reaction medium. To maintain solubility of the cuprous chloride, it is disclosed to be necessary to control the atomic ratio of halogen to the heavy metal greater than about 6.5:1 and preferably greater than about 7.5:1. As disclosed in said copending application, there occurs during the oxidation and subsequent distillation of the product an unavoidable loss of halogen and it is therefore desirable to continuously analyze the recycle catalyst solution for halogen content and to continuously add the necessary amount of halogen thereto to maintain said ratio. This control of halogen to heavy metal ratio is particularly desirable in combination with the reduction treatment disclosed in the aforesaid copending application. In this manner, a control of the oxidation system can be provided that substantially eliminates any problems in the distillation and recovery of the oxidized product caused by instability or insolubility of the catalytic and redox salts used in the oxidation system.

We have now found, however, that during the oxidation there occurs an unavoidable degree of conversion of the ethylene to oxalic acid. The oxalic acid concentrates in the reaction medium since it is a relatively high boiling byproduct and refractory to the oxidizing conditions in the reactor. Additionally, the oxalic acid is also undesired since it forms highly insoluble salts with most of the heavy metal redox agents, in particular, cupric oxalate. The extent of this formation of oxalic acid is dependent on the severity of the oxidizing conditions, i.e., temperature, pressure, partial pressure of oxygen, etc. However, the rate of its formation is sufficient that upon several recycles of the reaction medium most of the heavy metal redox agent is precipitated. When this occurs, the catalytic activity of the solution is destroyed and no measurable degree of oxidation occurs.

It is an object of this invention to provide for the continuous removal of oxalic acid from the reaction medium during the aforesaid catalytic oxidation of olefins.

It is a further object of this invention to provide a continuous method for the oxidation of olefins to valuable carbonyl compounds while continuously recycling the reaction medium and catalyst to the oxidation zone.

It is also an object of this invention to provide a method for destroying the oxalic acid byproduct formed during the oxidation.

It is also a further object to provide a method whereby the oxalic acid byproduct of the oxidation can be destructively oxidized during the contacting of the olefin and oxygen with the reaction medium.

Other and related objects of this invention will be apparent from the following description of the invention, which is illustrated by:

FIGURE 1 which is a flow diagram of a single stage reaction method; and

FIGURE 2 which is a flow diagram of a two-stage reaction method.

Various methods can be employed for removal of the oxalic acid formed during the oxidation. Because most of the heavy multivalent metals that are used as redox agents form highly insoluble oxalate salts, the oxalic acid can be removed by continuously separating all or a portion of the solids from the reaction medium. The solids can then be treated to dissolve the platinum group metal by the addition of the reaction solvent and contact with oxygen at reaction conditions. The remaining insoluble solid can be discarded. Since this comprises a loss of valuable heavy metal cations from the system, preferably the insoluble solids are treated so as to dissolve the heavy metal cations and free them from the oxalate anion. Suitable treatments comprise treating the insoluble material with a strong oxidizing agent, e.g., aqua regia or dissolution of the solid in ammonium hydroxide and recovery of the cation therefrom by ion exchange by passing the resultant solution over a cation exchange resin such as a hydrogen charged sulfonated polystyrene resin.

In a preferred treatment the insoluble solid is contacted with reaction solvent, oxygen and catalytic amounts of a vanadium compound at temperatures from about 30° to about 300° C. and pressures from about 5 to about 100 atmospheres, sufficient to maintain liquid phase conditions. Under such conditions, the oxalate is destructively oxidized and the heavy metal multivalent cation is dissolved in the reaction solvent for recycling.

We have also found that the oxalic acid formed during the oxidation of ethylene to carbonyl compounds, e.g., vinyl acetate, can be destroyed during the oxidation step without separation from the reaction medium by the addition of controlled amounts of a vanadium compound thereto. Vanadium compounds used in catalytic amounts exert a high degree of oxidation activity to the oxalic acid and insoluble oxalates formed during the oxidation. In this respect, we have found that vanadium compounds are unique in activity, closely related and other similar metallic compounds having no appreciable activity for such oxidation. In addition, we have discovered that the addition of vanadium compounds in the aforementioned catalytic amounts does not appreciably alter the attractive high rate of oxidation in the process nor measurably alter the distribution of the oxidized products obtained therefrom. The amount of vanadium compound employed can very considerably, generally between about 0.01 and about 2.0 weight percent of a vanadium material is employed and preferably between about 0.05 and about 0.5 weight percent. Preferably the compounds are soluble in the reaction medium and include inorganic compounds such as vanadic acid, vanadium pentoxide, vanadium tribromide, vanadium dichloride, vanadium trichloride, vanadium tetrachloride, vanadium pentafluoride, vanadyl halides such as vanadyl bromide, vanadyl chloride, dichloride, trichloride, and various alkali metal, alkaline earth metal or ammonium vanadate salts such as sodium vanadate, lithium vanadate, potassium vanadate, etc. Organic vanadium compounds which are useful include organic amine salts such as trimethyl ammonium vanadate, ethyl isopropyl ammonium vanadate, etc.; organic vanadium complexes such as vanadium acetylacetonate, the citric acid complex of vanadium, etc.; vanadium carboxylates of lower molecular weight carboxylic acids such as vanadium acetate, vanadium isopropionate, vanadium butyrate, vanadium valerate, etc.

As previously mentioned, the catalyst solution contains catalytic amounts of a palladium group metal and a halogen, i.e., a bromine or chlorine containing compound. The platinum group metal can be of the palladium subgroup or the platinum sub-group, i.e., palladium, rhodium, ruthenium or platinum, osmium or iridium. While all of these metals are active for the reaction, we prefer palladium because of its much greater activity. The platinum group metal can be employed in amounts between about 0.001 and about 5 weight percent of the liquid reaction medium, however, the reaction rate decreases at concentrations of platinum group metal less than about 0.04 weight percent and amounts of the metal in excess of about 2.0 weight percent do not appreciably increase the rate of oxidation. Accordingly, the preferred limit of the metal is between about 0.04 and about 2.0 weight percent of the catalyst solution. The platinum group metal can be added to the reaction medium as finely divided metal, as a soluble salt or as a chelate. Examples of suitable salts are the halides and acetates such as palladium chloride, rhodium acetate, ruthenium bromide, cesium oxide, iridium chloride and palladium chloride. Examples of suitable chelates are palladium acetylacetonate and complexes of noble metal ions with such conventional chelating agents as tetraacetic acid, citric acid, etc.

The other necessary component of our catalyst solution is a halogen, i.e., bromine or chlorine containing compound. The halogen can be added as elemental chlorine or bromine; however, it is preferred to employ less volatile halogen compounds such as hydrogen chloride; hydrogen bromide; alkali metal halides, e.g., sodium chloride, lithium bromide, cesium chloride, potassium bromide, sodium bromate, lithium chlorate; ammonium halides, ammonium bromide, ammonium chloride, or any of the aforementioned platinum metal bromides or chlorides. Various organic compounds which liberate hydrogen halide or halogen under the reaction conditions can be used, such as aliphatic chlorides or bromides, e.g., ethyl bromide, propyl chloride, butyl chloride, benzyl bromide, phosgene, etc. In general, sufficient of the aforementioned halogen containing compounds should be added to provide between about 0.05 and about 5.0 weight percent free or coordinately bonded or covalently bonded halogen in the reaction zone; preferably concentrations between about 0.1 and about 3.0 are employed. While chlorine containing compounds are generally preferred, bromine compounds can be preferred for certain reactions, e.g., in substantially anhydrous acetic acid, bromine compounds tend to favor oxidation of ethylene to vinyl acetate whereas chlorine compounds tend to favor the oxidation of ethylene to acetaldehyde and, ultimately, to acetic acid.

As previously mentioned, the reaction medium preferably comprises a substantially anhydrous organic solvent. In general, the water content of the reaction medium should be less than about 20 weight percent, preferably less than about 10 percent and, most preferably, less than about 3 weight percent. During the oxidation of the olefin, water is formed and accumulates in the reaction medium. Accordingly, it is preferred to recycle the reaction medium as a substantially anhydrous liquid and to employ relatively high liquid space rates to prevent the accumulation of amounts of water in excess of those previously stated. In general, the presence of the water in the reaction medium favors the oxidation of the olefin to aldehydes or ketones whereas the oxidation in anhydrous or substantially anhydrous organic media favors more valuable oxidized products such as the desired unsaturated esters.

For the preparation of unsaturated esters of carboxylic acids, the reaction medium should comprise a carboxylic acid preferably having 2 to about 10 carbons, such as acetic, propionic, butyric, valeric, isovaleric, caprylic, isocaprylic, succinic, glutaric, adipic, pimalic, etc. Monocarboxylic acids having 2 to 5 carbons are most preferred. Preferably, the carboxylic acid employed is the acid of the desired acyloxy radical desired in the unsaturated ester, e.g., acetic acid is used in the preparation of vinyl acetate, propionic acid is employed in the preparation of vinyl propionates, etc.

Various other inert organic solvents can be employed in addition to the aforementioned carboxylic acid. Examples of various organic liquids that can also be present in amounts between about 0 and about 90 percent of the reaction medium employed for the synthesis of the unsaturated esters include formamide, dimethyl formamide, chlorobenzene, dichlorobenzene, aliphatic hydrocarbons such as hexane, decane, dodecane, etc.; toluene, xylene, pseudocumene, etc.

In the oxidation of olefins to unsaturated esters, the yields of ester product can be greatly increased by the addition of various carboxylate salts to the reaction medium. Generally, any soluble carboxylate salt can be added such as alkali metal carboxylates, alkaline earth carboxylates, any of the aforementioned Group VIII noble metal carboxylates or a carboxylate salt of the optional redox metals hereinafter described. The alkali metal carboxylates are preferred for their greater solubility in the organic reaction medium and of these, lithium carboxylates are most preferred. Generally, between about 0.1 and about 10 weight percent of a soluble carboxylate salt is added, preferably between about 0.5 and about 5.0 weight percent is employed. The particular alkali or alkaline earth metal chosen has some effect on the distribution of products in the unsaturated ester production, particularly the vinyl acetate synthesis. To illustrate, the use of sodium and potassium acetates generally favor acetaldehyde and vinyl acetate production and the lithium salts favor acetic acid production. Lithium salts can be used in this oxidation because of their greater solubility and hence, the greater acetate ion concentration that can be achieved with the use of lithium. However, when a slurry system is not objectionable, sodium salts are preferred as these salts affect a lower conversion to undesirable byproducts, in particular, lower yields of butenes are produced with sodium than with lithium salts. Examples of other carboxylate salts are the alkaline earth carboxylates such as calcium, magnesium, barium, beryllium and strontium and these salts can be used in the same manner as described in regard to the alkali metal salts.

It is of course apparent that the carboxylate salts can be formed in situ by the addition of the hydroxides of most of the aforementioned metals, particularly the alkali metal hydroxides or halides.

As previously mentioned, various redox compounds can, optionally, be used in the reaction medium. In general, any multivalent metal salt having an oxidation potential higher, i.e., more positive, than the platinum metal in the solution can be used. Typical of such are the soluble salts of multivalent metal ions such as the acetates, bromides or chlorides of copper, iron, manganese, cobalt, mercury, nickel, cerium, uranium, bismuoth, tantalum, chromium or molybdenum. Of these, cupric and ferric salts are preferred and cupric salts are most preferred, particularly in the substantially anhydrous medium where the cupric salts appreciably increase the rate of oxidation. In general, cupric acetate, chloride or bromide is added to the reaction medium to provide a concentration of copper therein between about 0.1 and about 5 weight percent; preferably between about 0.5 and about 3.0 weight percent.

Various other oxidizing agents can also be employed to accelerate the rate of reaction. Included in such agents are the nitrogen oxides that function in a manner similar to the redox agents previously described. These nitrogen oxides can be employed as the only redox agent in the reaction medium or they can be employed jointly with the aforedescribed redox metal salts such as cupric or ferric salts. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors.

The nitrogen oxides can be added to the reaction medium in various forms, e.g., nitrogen oxide vapors such as nitric oxide, nitrogen dioxide, nitrogen tetraoxide, etc. can be introduced into the reaction medium or soluble nitrate or nitrite salts such as sodium nitrate, lithium nitrate, lithium nitrite, potassium nitrate, cesium nitrate, etc., can be added to the reaction medium. In general, the use of these nitrate redox agents are preferred in anhydrous systems and the combined use of cupric salts and nitrate co-redox agents is most preferred for the low temperature operations where the reaction rate would otherwise be prohibitively slow. The use of the nitrogen oxide as redox agents does not appreciably alter the yields of the major products, i.e., vinyl acetate, acetaldehyde and/or acetic acid.

In general, the oxidation of olefins to unsaturated esters, e.g., ethylene to vinyl acetate, propylene to isopropenyl acetate and acetone, etc., is performed by introducing oxygen or an oxygen containing gas and the olefin into contact with the catalyst at temperatures between about 30° and about 300° C.; 90° to about 180° C. are preferred, and to obtain optimum yields of unsaturated esters, temperatures between about 120° and about 160° C. are most preferred. In general, the oxidation of ethylene to high yields of acetic acid is favored at higher temperatures and therefore, when operating so as to generate sufficient acetic acid in situ to equal that consumed in the formation of vinyl acetate, the higher temperatures are preferred in this synthesis, from about 130° to about 180° C.

The reaction pressures employed in either oxidation are sufficient to maintain liquid phase conditions and from about atmospheric to about 100 atmospheres or more, preferably elevated pressures from about 10 to about 75 atmospheres are employed and, most preferably, pressures from about 40 to about 75 atmospheres are used to obtain a high reaction rate. In general, high ethylene partial pressures result in maximum rates of oxidation. Additionally, the use of high ethylene partial pressures in the synthesis of vinyl acetate results in maximum acetaldehyde and vinyl acetate synthesis.

Under the aforedescribed conditions, the olefin is rapidly oxidized to the desired compounds. In general, the liquid catalyst solution is supplied and recycled to the reaction zone at maximum rates to prevent the accumulation of substantial amounts of water that will otherwise reduce the rate of oxidation.

FIGURE 1 illustrates a single stage process employing our invention. As illustrated, an olefin such as ethylene, propylene, butene-1 or pentene-1; preferably ethylene; is introduced through line 1 to reactor 2. Oxygen or a suitable oxygen containing gas such as air or mixtures of oxygen with air and/or a suitable inert gas, e.g., nitrogen, carbon dioxide, etc., is introduced through line 3 as the source of oxidant. The reactor 2 can be a suitable stirred liquid phase reactor or, if desired, can be packed with a suitable inert medium such as silica gel, diatomaceous earth, titania, Carborundum, carbon, etc. Recycle ethylene is returned to the reactor through gas recycle line 4 and the catalyst solution is introduced to the reactor through liquid recycle line 5. The crude oxidation produce is removed through line 6 and passed to guard chamber 7 where it is contacted with any of the aforementioned reducing gases. Preferably, high pressures, e.g., 10 to about 100 atmospheres, are used in this step at temperatures between about 30° C. to about 300° C. Most preferably, the guard chamber is operated under the pressure and temperature conditions previously set forth for the reaction in reactor 2.

The gases from the reduction guard chamber are passed through line 9, combined with the reactor 2 effluent gases and the combined gas stream is repressured with compressor 10 for recycling to the reactor through conduit 4. In the preferred process, an oxygen analyzer and meter 30 can be used to measure the oxygen content of the reactor effluent gases or of the vapors within the upper portion of reactor 2. The meter can be set to automatically control this variable by controlling the setting of flow control valves 31 and/or 32 to decrease the reltaive rate of oxygen supply to reactor 2 when the measured oxygen content exceeds the aforementioned predetermined levels. Because some fixed gases accumulate during the oxidation, such as carbon oxides formed in reactor 2 or in guard chamber 7 when carbon monoxide is used as the reducing gas, it is preferred to pass all or a portion of the recycle gas stream through a suitable fixed gas removal step shown at 11. Examples of suitable removal of fixed gases can be treatment of the recycle gas stream with an alkali metal hydroxide solution, ethanolamine solution or an alkali metal carbonate solution, etc.

The reduced liquid crude product is removed from guard chamber tower 7 through line 12, cooled in cooler 8 and passed to a flash zone 13 where the residual or soluble ethylene and other gases are separated through line 14, repressured by compressor 15 for recycling to reactor 2.

The crude product from the flash zone 13 comprises a slurry of the finely divided platinum group metal. This slurry can be handled under most circumstances in the subsequent product recovery zone and, accordingly, is passed through line 19 directly to the product recovery steps in zone 20. If desired, however, all or a portion of the crude product from flash zone 13 can be passed through line 21 to a suitable solid-liquid separation step, e.g., a centrifugal separator or other fitration means illustrated as 22 in the flow diagram. The clarified liquid product is then passed through line 23 to product recovery zone 20. The separated catalyst metal is recovered through line 24 for recycling to the oxidation zone.

The solids removed by line 24 will also contain the insoluble oxalate salts of the multivalent heavy metal redox agent with an exception when iron salts are used as the redox agents. The slurry can be filtered, the filtrate returned to the reactor and the calcium oxalate discharged through line 46.

To recover the platinum group metal catalyst from the mixture of solids in line 24, the solids are contacted in zone 42, with oxygen from line 44, and recycle reaction medium from line 43. The temperature of oxidation is maintained between about 50° and 200° C. and the pressure is maintained between about 5 and 60 atmospheres to maintain liquid phase conditions. Under these conditions, the platinum group metal is oxidized and dissolves in the reaction medium in which it is removed through line 29.

The insoluble heavy metal oxalate removed through line 46 can thereafter be subjected to the aforementioned treatments for recovery of the heavy metal cation.

Preferably, however, a vanadium compound is incorporated in the reaction medium and this compound permits the destructive oxidation of the oxalic acid byproduct in reactor 2 thereby eliminating need for treatment in zone 42.

Suitable product recovery steps can be employed in zone 20, depending on the nature of the products produced. In the synthesis of vinyl acetate by the oxidation of ethylene in an acetic acid reaction medium these steps can comprise the distillation of all components boiling below acetic acid in the first stage, with subsequent distillation steps to separate the acetaldehyde byproduct and azeotropic distillation of a water-vinyl acetate azeotrope. The vinyl acetate is subsequently purified for recovery through line 25 as the major oxidized product. The acetaldehyde byproduct also recovered can be marketed as such or preferably, can be oxidized to acetic acid for recycling to oxidation zone 2 as a supply of acetic acid thereto. The water formed in the reaction is removed through line 26.

The recycle reaction, i.e., carboxylic acid, is recovered from the product recovery zone through line 27 and recycled to the oxidation reactor 2. This reaction medium contains the amounts of platinum group metal catalyst and heavy metal redox salt that were soluble in the crude oxidate recovered from the flash zone 13. The content of this reaction medium is carefully controlled in accordance with our invention by the addition of the necessary amounts of catalytic components and halogen through line 28. Preferably, however, a continuous stream of the recycle reaction medium is withdrawn through line 37 and passed to a suitable meter for the continuous analysis of halogen content as indicated at 36. The stream is returned to the main reaction medium recycle stream through line 33. The meter 36 serves to continuously indicate the halogen content of the recycle stream. Preferably, this meter also continuously controls the addition of the necessary amount of halogen through line 34 and flow control valve 35. A hydrogen halide can be employed as the source of halogen so introduced through line 34; however, when the reaction medium is indicated to have insufficient amounts of various catalytic components such as the necessary amounts of an alkali metal and/or amounts of the heavy metal redox agents, these materials can be supplied as their halogen salts through line 34 also.

While the preceding discussion has described the continuous analysis of the reaction medium recycle stream for halogen content or addition of halogen thereto, it is within the scope of our invention to interpose this analysis and control at any point in the system, e.g., in line 19, in reactor 2, in flash zone 13, or in line 12. In a similar manner, oxygen analyzer 30 can be employed to continuously measure the presence of oxygen in the vapor space of reactor 2 rather than the vapor effluent therefrom. It is of course apparent that other obvious modifications of the process can be made without departing from the scope of the described invention.

FIGURE 2 illustrates the two-stage method for practicing our invention. In this method, the olefin, ethylene, is introduced into reactor 50 by line 51 together with recycle gases from lines 52 and 53 and their respective recycle gas blowers 54 and 55. The recycled reaction medium having the catalyst and salt components is introduced into reactor 50 by line 56 and make-up of the various components of the medium is made through line 57.

A liquid effluent is withdrawn through line 58, flashed in zone 59 and the liquid residue is passed through heater 60 to the distillation tower from which vinyl acetate is withdrawn as a distillate through line 61. The tower is refluxed through line 62. The distillation residue which contains the reduced catalyst, e.g., palladium and cuprous salts is passed to oxidation zone 65 by pump 64 and is contacted therein with oxygen introduced through line 66. The regeneration catalyst in the reaction medium is then pumped to dryer 67 where the water formed in zone 65 is volatilized and removed.

The process conditions and concentration of the various components of the reaction medium used in the two-stage system are substantially identical to those previously set forth in the description of the single stage. It is of course apparent that the need to control the oxygen partial pressure in reactor 50 is obviated by this technique and also that relatively impure oxygen, e.g., air, can be used in oxidizer 65 because of the separation of the reactions in these zones. In other respects, however, the conditions and catalyst used are substantially the same as those described for the single stage including the use, in the reaction medium, of the vanadium compound to catalyze the destructive oxidation of oxalic acid and oxalates which occurs in zone 65.

The following examples will illustrate the results obtainable when practicing my invention:

EXAMPLE 1

To a ½-gallon autoclave was added 500 grams acetic acid, ½ gram palladium chloride, 5 grams lithium chloride, 5 grams lithium acetate dihydrate, and 3 grams cupric acetate monohydrate. The autoclave was closed and pressure to 500 p.s.i.g. with ethylene and then heated to 300° F. The autogenic pressure of the autoclave was 700 p.s.i.g. Thereafter, over a 30-minute period, oxygen was slowly adimtted at 10 pound increments of pressure while periodically introducing ethylene to maintain the reaction pressure at about 700 p.s.i.g. After 30 minutes, the reaction was discontinued and the autoclave cooled, opened and the contents weighed. A total of 96 grams weight increase was observed. The liquid products were distilled and analyzed for products and the following distribution was obtained in mol percent of the total products:

Table

| | Mol percent |
|---|---|
| Butenes | 8.9 |
| Acetaldehyde | 33.9 |
| Vinyl acetate | 54.3 |
| Ethyl chloride | 2.9 |

The experiment was repeated, however, 5 grams oxalic acid was added to the autoclave at the start of the oxidation period. The autoclave was then pressured as previously mentioned, heated to 300° F. and oxygen was introduced; however, no oxidation occurred under these conditions. The autoclave was cooled, opened and an insoluble solid phase was observed in the autoclave that was analyzed and found to comprise cupric oxalate.

To the autoclave contents from the preceding unsuccessful attempt at oxidation, 1 gram of ammonium vanadate was added. The autoclave was pressured with ethylene to 500 p.s.i.g., heated to 300° F. and thereafter oxygen was introduced at 10 pound increments. The reaction was observed to proceed immediately and the run was continued for a 30-minute period during which oxygen was periodically introduced and ethylene was employed to maintain the reaction pressure at about 700 p.s.i.g. The autoclave was thereafter cooled, opened and its contents weighed to measure a 107 gram increase. The liquid products were analyzed and found to be substantially identical to the distribution of products obtained in the oxidation wherein no oxalic acid or ammonium vanadate was employed. No insoluble cupric oxalate was detected in the liquid products.

The experiment was repeated by the addition of 1 gram of vanadium tetroxide to the reaction medium that also contained 7.5 grams of oxalic acid. Again, the oxidation proceeded smoothly for a total of 83 grams of oxidized product within a 30-minute period.

The experiment was repeated with the addition of 1 gram of vanadyl chloride and 7 grams of oxalic acid. The oxidation again proceeded smoothly and a total of 123 grams of oxidized products were obtained.

Various other metal catalysts known to have oxidation activity were employed without success. These unsuccessful attempts included the addition of 1 gram of cobalt acetate, 1 gram of manganese acetate, 1 gram of ammonium tungstate, 3 grams of copper acetate, 1 gram of ferric acetate. The presence of oxalic acid also precluded oxidation in separate experiments made with the addition of 6 grams of lithium bromide and the addition of 5 grams of nitric acid. The addition of nitric acid permitted the oxidation to proceed somewhat since nitric acid also functions as a redox agent. Upon completion of the oxidation, the reactor contents were inspected and insoluble cupric oxalate was nevertheless present. This experiment indicates that the nitric acid does not have sufficient catalytic activity for the destructive oxidation of the insoluble oxalae salts formed during the oxidation in the presence of oxalic acid.

EXAMPLE 2

A continuous oxidation unit was provided comprising a liquid phase stirred reactor, 3 inches in diameter. In the reactor was placed a product withdrawal line which was passed to a second reactor modified to permit passing of the crude product downwardly, countercurrent to a flow of nitrogen. The crude product was withdrawn from the base of the second reactor into a level controller, through a water cooler, a back pressure control valve, a gas-liquid separator and, finally, a product drum.

The reaction medium comprising acetic acid and containing 1 weight percent lithium chloride, 1 weight percent lithium acetate dihydrate, 0.6 weight percent cupric acetate monohydrate, 0.1 weight percent palladium chloride and 2.0 weight percent titanium dioxide powder, was pumped to the reactor at a rate of 1980 milliliters per hour. Ethylene was introduced into contact with the reaction medium entering the reactor at a rate of 290 liters per hour and oxygen was introduced into the base of the reactor at a rate of 120 liters per hour. The gases discharged from the liquid gas separator were passed through an oxygen analyzer and the rate of oxygen inlet to the reactor was controlled to prevent any detectable oxygen appearing in the exit gas.

The liquid product so collected was continuously distilled in a distillation column containing a rectification section comprising a 20-plate, 1-inch diameter Oldershaw and a 15-plate, 2-inch diameter stripping section. The distillation column was controlled by refluxing the overhead condensate so as to completely dehydrate the reaction medium. The bottoms from the distillation were analyzed for halide content and sufficient quantities of hydrogen chloride were added to the liquid together with sufficient quantities of acetic acid to restore the liquid reaction medium. The reaction medium was thereafter recycled to the oxidation zone.

During the oxidation the activity of the catalyst declined steadily until, on the fourth recycle, palladium chloride and cupric acetate were added to the reaction medium in amounts comprising 0.1 and 0.6 weight percent, respectively, of the reaction medium. Upon the addition of the fresh quantities of catalyst and multivalent heavy metal redox agent, the original activity of the solution was restored.

Upon completion of the run after the fourth recycle, the reaction medium was filtered to separate the solids therefrom. The solids were extracted with ammonium hydroxide, evaporated to dryness and then washed with 50 percent sulfuric acid. The remaining solid was blue in coloration and was analyzed by infrared and found to comprise cupric oxalate.

The experiment was repeated with the presence of 0.1% ammonium vanadate in the solution. The run was extended through about 25 recycles. Upon completion of the run, the solids in the liquid were analyzed and no cupric oxalate was present.

EXAMPLE 3

To illustrate the reaction with other carboxylic acids, the preceding example was repeated using propionic acid as the reaction solvent containing in each 1000 grams of solvent the following catalyst components:

| | Grams |
|---|---|
| Lithium chloride | 3.5 |
| Lithium propionate | 10.0 |
| Cupric chloride | 5.0 |
| Palladium, (calculated as the metal) | 0.6 |
| Vanadyl chloride | 5.0 |

The reaction was performed at 300° F. (same as in Example 2), and at 750 p.s.i.g. pressure. The liquid contact time was 15 minutes and the reactant flow rates were:

| | Liters/hour |
|---|---|
| Ethylene | 370 |
| Oxygen | 185 |
| Propionic acid | 1975 |

The crude reaction product was collected and distilled and the following products were obtained:

| Product: | Yield (based on ethylene converted) |
|---|---|
| Carbon dioxide | 4.9 |
| Butenes | 0.9 |
| Formaldehyde | 1.8 |
| Ethyl chloride | 0.1 |
| Acetaldehyde | 8.8 |
| Methyl acetate | 1.3 |
| Vinyl acetate | 1.9 |
| Acetic acid | 18.2 |
| Ethylidene diacetate | 0.5 |
| Glycol diacetate | 1.3 |
| Propionic acid | 30.1 |
| Vinyl propionate | 28.3 |

Similar yields of vinyl esters of alkanoic acids can be obtained by replacement of the propionic acid with such acids, e.g., with butyric or valeric.

EXAMPLE 4

To illustrate the two-stage process, the following catalyst solution is prepared:

| | Weight percent |
|---|---|
| Acetic acid solvent | 74.6 |
| $Pd^{++}$ (added as the chloride) | 0.35 |
| $Cu^{++}$ (added as the acetate) | 7.7 |
| $Li^+$ (added as the chloride) | 0.3 |
| $CH_3COO^-$ | 14.4 |
| $Cl^-$ | 1.7 |
| Ammonium vanadate | 1.0 |

The catalyst solution is added to the reaction flask of a Parr hydrogen apparatus and heated to the desired reaction temperature. The flask is then evacuated and then a pressurized container of ethylene is opened to admit ethylene into contact with the solution. The flask is rocked to agitate its contents and the reaction temperature is maintained by an infrared lamp. The decrease in ethylene pressure on the flask—affected by the rate of ethylene absorption—is observed to follow the course of the reaction. After a steady pressure state has been reached, the flask is removed, its contents are filtered and the filtrate is fractionated to recover a crude vinyl acetate product.

The spent catalyst solution containing metallic palladium and insoluble cuprous chloride was heated to reflux temperature and oxygen is introduced to reoxidize the catalyst. Upon completion of the reoxidation, as indicated by the complete solution of the flask contents, the experiment is repeated to produce an additional quantity of vinyl acetate from ethylene. The presence of the vanadium compound in the catalyst solution effectively prevents the accumulation of oxalic acid and thereby maintains the solubility of the cupric salts and activity of the catalyst.

The preceding examples are intended solely to illustrate a mode for practicing our invention and to demonstrate the results obtainable thereby. The examples are not intended to be construed as unduly limiting of our invention which is defined by the method steps and their apparent equivalents set forth in the following claims.

We claim:
1. In the oxidation of ethylene to vinyl acetate wherein ethylene and oxygen are contacted with a substantially anhydrous reaction medium comprising acetic acid, an acetate selected from the class of alkali metal and alkaline earth metal acetates, a halogen compound selected from the class of bromine and chlorine compounds, catalytic amounts of a member selected from the class consisting of a platinum group metal and halide salts thereof and a salt of a multivalent heavy metal having a more positive oxidation potential in said reaction medium than said platinum group metal and wherein oxalic acid is produced as a byproduct of the oxidation and precipitates said multivalent metal as an insoluble oxalate, the improved method for preventing the precipitation of said multivalent metal and thereby maintaining the catalytic activity of the reaction medium that comprises the destructive oxidation of the oxalic acid byproduct of said oxidation by the contacting of at least a portion of the reaction medium with catalytic amounts of from 0.05 to 0.5 weight percent of a vanadium compound and oxygen at a temperature from about 30° to 300° C. and a pressure from 5 to 100 atmospheres, sufficient to maintain liquid phase conditions.

2. The oxidation of claim 1 wherein said vanadium compound is ammonium vanadate.

3. In the oxidation of ethylene to vinyl esters of alkanoic acids having one to about 5 carbons wherein ethylene and oxygen are contacted with a substantially anhydrous reaction medium comprising an inert organic solvent containing an alkali metal carboxylate of said alkanoic acid, between about 0.1 and 10 weight percent of a halogen compound selected from the class of bromine and chlorine compounds, catalytic amounts of a member selected from the class consisting of a platinum group metal and halide and acetate salts thereof, between about 0.1 and about 5 weight percent of a salt of a multivalent heavy metal having a more positive oxidation potential in said reaction medium than said platinum group metal, the improvement that comprises employing in said reaction medium between about 0.01 and 2.0 weight percent of a vanadium compound to catalyze the destructive oxidation of oxalic acid byproduct of said oxidation.

4. The oxidation of claim 3 wherein said alkanoic acid is acetic acid and said ester is vinyl acetate.

5. The oxidation of claim 3 wherein said vanadium compound is ammonium vanadate.

6. The oxidation of claim 3 wherein said salt of a multivalent heavy metal is a cupric salt.

7. The oxidation of claim 6 wherein said ethylene and oxygen are contacted with said reaction medium in separate reaction zones.

References Cited

UNITED STATES PATENTS 3,076,032  1/1963  Riemenschneider et al. 260—597

FOREIGN PATENTS 608,610  3/1962  Belgium.

OTHER REFERENCES

Moiseev et al., Proceedings of the Acad. of Sciences, vol. 133, pp. 377 to 380, July 1964.

LORRAINE A. WEINBERGER, *Primary Examiner.*

V. GARNER, *Assistant Examiner.*